US009483877B2

(12) United States Patent
Fermin et al.

(10) Patent No.: US 9,483,877 B2
(45) Date of Patent: Nov. 1, 2016

(54) METHOD AND SYSTEM FOR PERSONALIZING IMAGES RENDERED IN SCENES FOR PERSONALIZED CUSTOMER EXPERIENCE

(75) Inventors: Jorel Fermin, Watertown, MA (US); Eugene Hsu, Somerville, MA (US); Nathaniel P. Woods, Lexington, MA (US)

(73) Assignee: Cimpress Schweiz GmbH, Winterthur (CH)

( * ) Notice: Subject to any disclaimer, the term of this patent is extended or adjusted under 35 U.S.C. 154(b) by 1025 days.

(21) Appl. No.: 13/205,604

(22) Filed: Aug. 8, 2011

(65) Prior Publication Data

US 2012/0259727 A1 Oct. 11, 2012

Related U.S. Application Data

(63) Continuation-in-part of application No. 13/084,550, filed on Apr. 11, 2011, now abandoned.

(51) Int. Cl.
*G06T 19/20* (2011.01)
*G06Q 30/00* (2012.01)
*G06T 15/50* (2011.01)

(52) U.S. Cl.
CPC ............... *G06T 19/20* (2013.01); *G06Q 30/00* (2013.01); *G06T 15/503* (2013.01); *G06T 2210/44* (2013.01); *G06T 2210/61* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,680,528 A * | 10/1997 | Korszun | ........................ 345/630 |
| 5,793,972 A | 8/1998 | Shane | |
| 5,867,282 A | 2/1999 | Fredlund et al. | |
| 5,898,594 A | 4/1999 | Leason et al. | |
| 5,963,214 A | 10/1999 | Cok et al. | |
| 5,986,671 A | 11/1999 | Fredlund et al. | |
| 6,018,397 A | 1/2000 | Cloutier et al. | |
| 6,069,637 A | 5/2000 | Gaglione et al. | |
| 6,069,712 A | 5/2000 | Dellert et al. | |
| 6,072,586 A | 6/2000 | Bhargava et al. | |
| 6,075,542 A | 6/2000 | Fredlund et al. | |
| 6,097,389 A | 8/2000 | Morris et al. | |
| 6,133,985 A | 10/2000 | Garfinkle et al. | |
| 6,147,742 A | 11/2000 | Bell et al. | |
| 6,157,436 A | 12/2000 | Cok | |
| 6,215,559 B1 | 4/2001 | Bryniarski et al. | |
| 6,388,732 B1 | 5/2002 | Williams et al. | |
| 6,512,570 B2 | 1/2003 | Garfinkle et al. | |
| 6,747,648 B2 | 6/2004 | Hoehn et al. | |
| 6,798,531 B1 | 9/2004 | Paz-Pujalt et al. | |
| 6,829,037 B2 | 12/2004 | Hill | |

(Continued)

OTHER PUBLICATIONS

Wauters, "DAZZ Offers a Way to Preview PhotoGifts Prior to Purchase," http://techcrunch.com; Feb. 28, 2009, Retrieved from the Internet: URL: http://techcrunch.com/2009/02/28/dazz-offers-a-way-to-preview-photo-gifts-prior-to-purchase/.

(Continued)

*Primary Examiner* — Maurice L McDowell, Jr.
*Assistant Examiner* — Raffi Isanians
(74) *Attorney, Agent, or Firm* — Jessica Costa

(57) ABSTRACT

Systems and methods are described for generating and using a flexible scene framework to render dynamically-generated content within contextual scenes to personalize a customer's web experience.

28 Claims, 12 Drawing Sheets

(56) References Cited

U.S. PATENT DOCUMENTS

| | | | |
|---|---|---|---|
| 6,924,878 B2 | 8/2005 | Garfinkle et al. | |
| 6,972,774 B2 | 12/2005 | Eguchi | |
| 7,006,890 B2 | 2/2006 | Foygel | |
| 7,007,243 B2 | 2/2006 | Baldino | |
| 7,032,182 B2 | 4/2006 | Prabhu et al. | |
| 7,088,374 B2* | 8/2006 | David et al. | 345/619 |
| 7,177,484 B2 | 2/2007 | Fredlund et al. | |
| 7,302,115 B2 | 11/2007 | Fredlund et al. | |
| 7,376,290 B2 | 5/2008 | Anderson et al. | |
| 7,548,949 B2 | 6/2009 | Anderson | |
| 8,533,064 B2 | 9/2013 | Tarvydas et al. | |
| 2004/0056871 A1 | 3/2004 | Milliron | |
| 2004/0133927 A1* | 7/2004 | Sternberg et al. | 725/136 |
| 2004/0189669 A1* | 9/2004 | David et al. | 345/619 |
| 2008/0215984 A1* | 9/2008 | Manico et al. | 715/730 |
| 2009/0249841 A1 | 10/2009 | Holmes | |
| 2011/0157226 A1 | 6/2011 | Ptucha et al. | |
| 2011/0170800 A1 | 7/2011 | Curlander et al. | |

OTHER PUBLICATIONS

Gilmours Wholesale Food & Beverage, "Webshot Help and Frequently Asked Questions," Retrieved from the Internet: URL: https://www.gilmours.co.nz/content/frequently_asked_questions.pdf, 5 pages, updated Mar. 22, 2011.

Ding, et al., "Semi-Automatic Image Personalization Tool for Variable Text Insertion and Replacement," Proceedings of the International Society for Optical Engineering SPIE, vol. 7540, pp. 1-11, XP-002678817, 2010.

Yen, et al., "Web-Based Virtual Reality Catalog in Electronic Commerce," Proceedings of the 33rd Hawaii International Conference on System Sciences, pp. 1-20, Jan. 4-7, 2000.

White et al., "Retexturing Single Views Using Texture and Shading," Computer Vision-ECCV 2006, Part IV, Lecture Notes in Computer Science 3954, pp. 70-81, Jan. 1, 2006.

"Notification of Transmittal of the International Search Report and the Written Opinion of the International Searching Authority, or the Declaration," mailed Aug. 3, 2012 for International Application No. PCT/US2012/033104.

"Notification of Transmittal of the International Search Report and the Written Opinion of the International Searching Authority, or the Declaration," mailed Jul. 25, 2012 for International Application No. PCT/US2012/033096.

Office Action dated Jan. 17, 2013 for U.S. Appl. No. 13/084,550.

Final Office Action dated Oct. 29, 2013 for U.S. Appl. No. 13/084,550.

\* cited by examiner

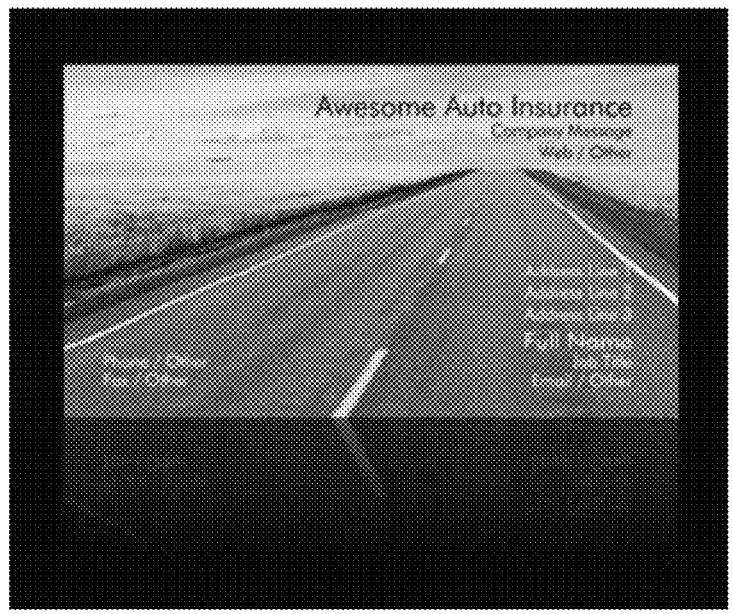
FIG. 5
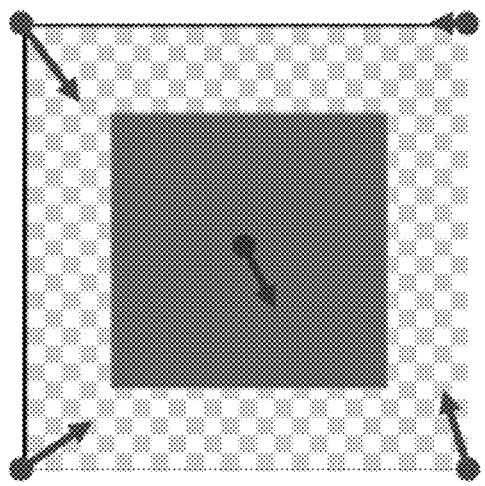 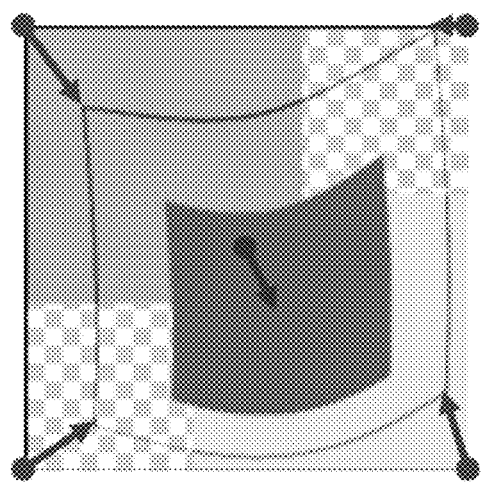
FIG. 6A  FIG. 6B

METHOD AND SYSTEM FOR PERSONALIZING IMAGES RENDERED IN SCENES FOR PERSONALIZED CUSTOMER EXPERIENCE

RELATED APPLICATIONS

The present application is a continuation-in-part of and claims priority to U.S. patent application Ser. No. 13/084,550, filed Apr. 11, 2011, now abandoned the entire contents of which are hereby incorporated by reference.

BACKGROUND

As consumers have become increasingly comfortable with online shopping, many retailers of products offer a retail presence to take advantage of the ecommerce marketplace. Some online retailers offer products that can be customized or personalized based on user-selected choices or inputs, and/or customer-specific information. For example, the www.vistaprint.com web site offers printed, engraved, and embroidered products that can be customized by the customer to include text and images selected and/or uploaded by the customer. For such online retailers, many of the images on the web site and on marketing materials are devoted to showing content on products, and products in context.

For example, a preview of a customer's selected design personalized with information entered by the customer may be presented to a customer selecting customizations and/or personalizing it with user-entered text and/or uploaded images. Besides merely showing the design imprinted, engraved, or embroidered on the product, a good preview might also show the product in context, for example within a larger scene. Previews of the customized products assist the customer in determining where the content is going to be placed, how large the product is, and/or how the product might fit their needs.

Contextual scenes can be created as composite images, for example using Adobe® Photoshop. Photoshop can be used to layer images on top of one another, rotate, warp, and blend images. However, when the composite image is saved using Photoshop, it is saved as a static image and cannot accept dynamically generated content. Online retailers who wish to show images with dynamically generated content, for example for showing images of products personalized with customer information, need to be able to generate customized images and place them within a larger scene on the fly without significant delay in order to prevent or reduce customer drop-off during the browsing process.

In the past, in order to generate previews in context, each context image was implemented as a separate class and had its own unique and static way of drawing itself. Each context image is independently coded by a human programmer in a browser-renderable language (such as HTML, DHTML, etc.), and then dynamically-generated content is rendered by the browser together with the context image. Generating browser-renderable context images in this way requires significant coding time due to having to code each scene image as its own individual class.

Accordingly, it would be desirable to have a streamlined process and system that allows simple specification of descriptions of scenes and the rendering of those scenes for quickly generating dynamically-generated content within contextual scenes without having to define and code a separate class for each scene image. It would further be desirable to inject personalized customer images into contextual scenes using the process and system. It would further desirable to dynamically generate personalized web pages and emails containing the personalized scenes. It would still further be desirable to utilize such technique to inject images of suggested or previously ordered personalized products into scenes and to provide in the email message or web page the ability for the customer to quickly order or reorder more of such products.

BRIEF DESCRIPTION OF THE DRAWINGS

FIG. 5 is an example composite scene image depicting a classic reflection scene;

FIG. 6A-6B diagrammatically illustrates the application of a smooth warp to an image;

SUMMARY

Embodiments of the present invention includes systems and methods for generating and using a flexible scene framework to render dynamically-generated content within contextual scenes.

In an embodiment, a method for personalizing a customer's web experience includes receiving an electronic document implementing a personalized product design of a customer, receiving a scene description that includes instructions for compositing at least one scene image and at least one injectable scene element, and for performing at least one image transformation on one or more of the scene images and injectable scene elements. The at least one injectable scene element is a variable element that replaces a placeholder element in the scene description when the scene description is processed. The method further includes receiving the scene description and one or more injectable scene elements, at least one of which includes the customer's personalized electronic document. The method further includes processing the received scene description to replace corresponding one or more placeholder elements in the scene description with the one or more injectable scene elements, and to perform the at least one image transformation and the compositing specified in the scene description to generate a composite scene image depicting the received injectable scene elements in a scene. The personalized composite scene image is embedded into a browser-renderable document for display to the customer to provide a personalized customer experience.

Additional embodiments include computer-readable storage media that implement the method, and a system for generating and using a flexible scene framework to render dynamically-generated content within contextual scenes.

DETAILED DESCRIPTION

Embodiments of the present invention utilize a novel scene framework to render dynamically-generated content within contextual scenes.

Figure 2:
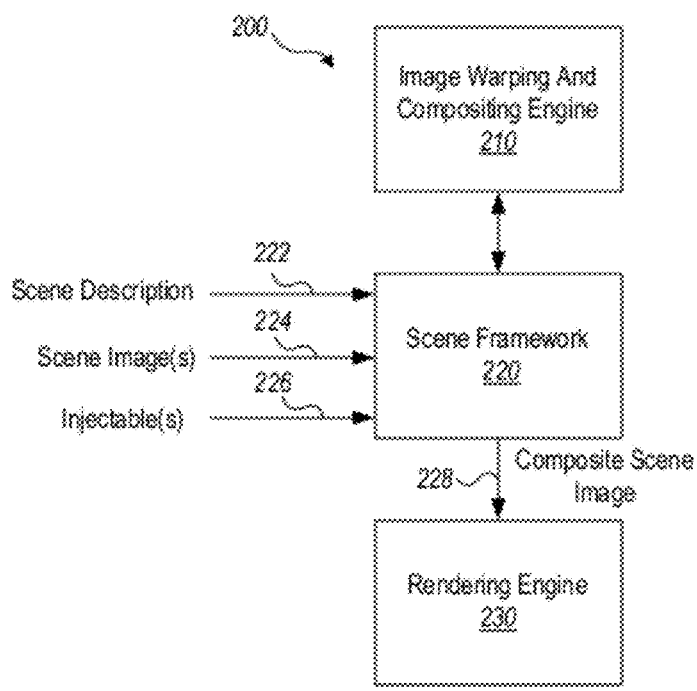
FIG. 2 is a block diagram of an embodiment of a system for generating scenes with dynamically-generated content for display in a browser.

FIG. 2 is a block diagram of a system 200 for generating scenes with dynamically-generated content for display in a browser. As illustrated, the system 200 includes an image warping and compositing engine 210, a scene framework engine 220, and a rendering engine 230.

The scene framework 220 receives or obtains a scene description 222, one or more scene image(s) 224, and one or more image(s)/text/document(s) (hereinafter called "injectable(s)") 226 to place within a generated scene. The scene framework 220 generates a composite scene image 228 containing the injectable(s) 224 composited into the received scene(s) 224 according to the scene description 222. The scene description 222 (also referred to herein as the "scene rendering code") is implemented using an intuitive language (for example, in an XML format), and specifies the warping and compositing functionality to be performed on the injectable(s) 226 and/or the scene(s) 224 when generating the composite image 228. A rendering engine 230 receives the composite image 228 and renders it in a user's browser.

The scene framework 220 is a graphical composition framework that allows injection of documents, images, text, logos, uploads, etc., into a scene (which may be generated by layering one or more images). All layers of the composite image may be independently warped, and additional layering, coloring, transparency, and other inter-layer functions are provided. The scene framework 220 includes an engine which executes, interprets, consumes, or otherwise processes the scene rendering code 222 using the specified scene(s) 222 and injectable(s) 224.

Figure 1:
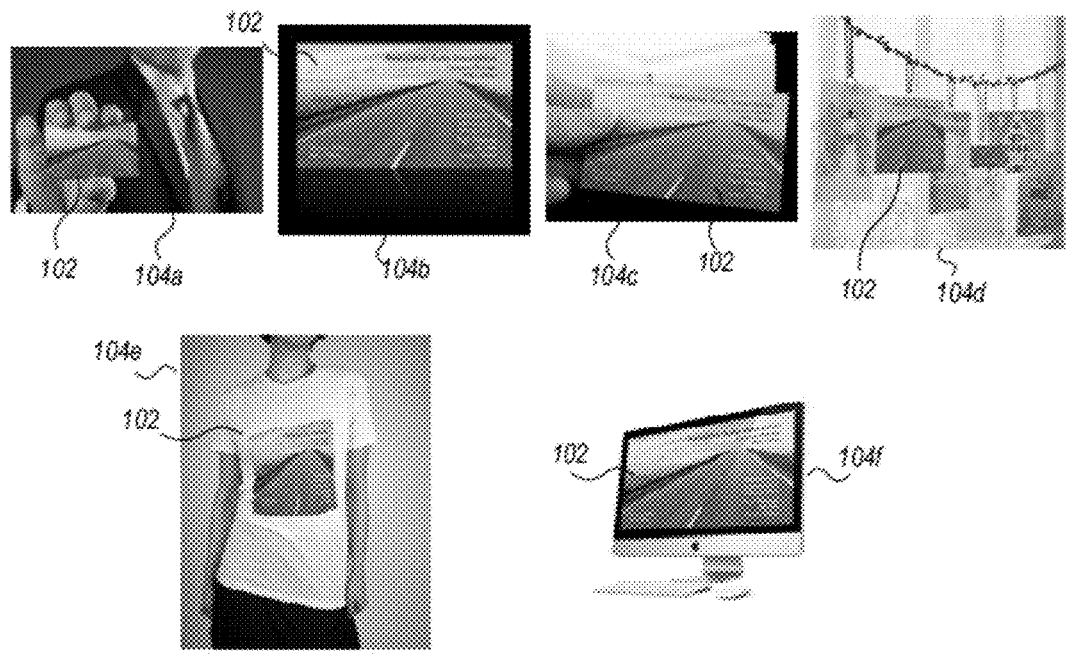
FIG. 1 illustrates examples of dynamically generated content incorporated within contextual scenes.

At a high level, the Framework 220 is a scene rendering technology for showing customized products in context. A generated preview of a customer's customized product may be transformed in various ways, and placed inside a larger scene. Examples of such generated previews implemented in contextual scenes are illustrated in FIG. 1, showing a customer's business card 102 in a variety of different scenes 104a, 104b, 104c, 104d, 104e, 104f.

Scenes can be chained or cascaded, so that one scene can be part of another scene and so forth. A scene may incorporate more than one placeholder location for an injectable scene element such as the business card 102 in each of the composite scenes 104a, 104b, 104c, 104d, 104e, 104f in FIG. 1.

In embodiment of the present invention, this is achieved by decorating rendered preview images of a product with additional image assets. Previously, generating scenes incorporating preview images involved substantial software development effort. This process has been vastly simplified thanks to several key components:

The Image Warping and Compositing Engine 210 which enables flexible and seamless positioning of documents within an image.

An intuitive XML format for implementing the scene rendering code 222 that allows designers to quickly prototype and deploy scenes with minimal interaction with software engineers.

A flexible Scene Framework 220 for processing the scene rendering code 222.

Turning first to the Image Warping and Compositing Engine 210, this component performs the image transformations and compositing. Image warping and compositing are two ways to assemble new images from existing ones. Historically, they have been achieved using a variety of techniques which yield inconsistent results. Furthermore, the ad hoc nature of these techniques added unnecessary complexity to the code. The novel warping and compositing framework provides image warping and compositing functionality to render scenes with dynamically injected content.

Image warping is the act of taking a source image and moving its pixels onto a target image. A number of typical image operations can be described in terms of image warping. For instance, a simple scaling operation (e.g., reducing a large photo to a thumbnail) is an image warp. More sophisticated warps may involve nonlinear effects such as wrapping an image around a cylinder or sphere.

The Image Warping And Compositing Engine 210 performs image warping and transformations. In an embodiment, the Image Warping And Compositing Engine 210 provides a class to perform warping, herein referred to as the "Warper" class. The Warper class includes a static method Apply (Bitmap target, Bitmap source, IWarp warp). This method takes two bitmaps and an "IWarp" object which specifies the warp itself.

In one embodiment, the Warper class implements inverse warping with bilinear sampling. The Warper iterates over each pixel in the target image, figures out the location in the source image it should come from, and copies the pixel color over. If the location happens to be between pixels in the source image (as is often the case) it will linearly interpolate the colors of the neighboring pixels to get the result.

Figure 3A:
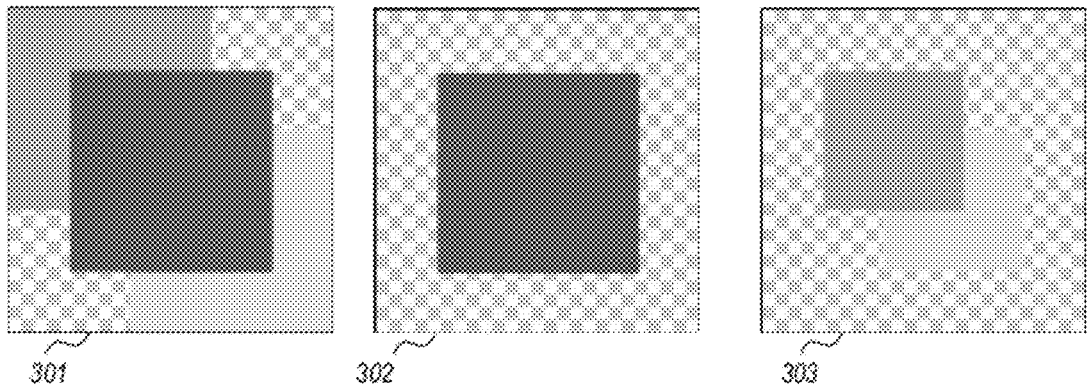
FIGS. 3A-3D diagrammatically illustrates the application of a perspective warp to an image, and the final resulting image.
Figure 3B:
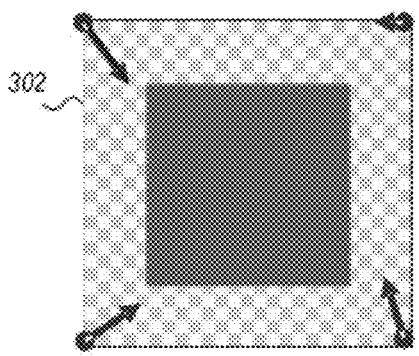
Figure 3C:
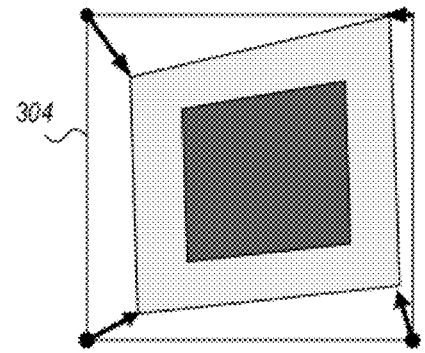
Figure 3D:
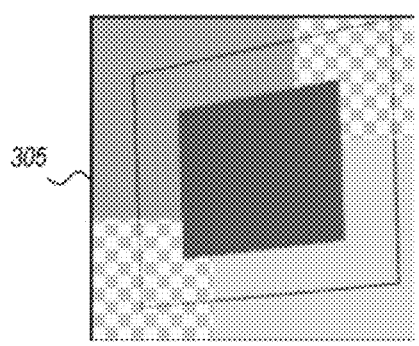

There are various types of warps. The simplest warp is known as the perspective warp. The perspective warp allows a user to move the corners of an image and warp the image accordingly. FIGS. 3A-3D illustrate the operation of a perspective warp. Consider a composite image 301 used as a foreground layer image in a composite image 302 over a background layer image 303, as illustrated in FIG. 3A. In this example, the foreground image 302 is to be warped from its original image (i.e., zero warp, as shown in FIG. 3A) to a secondary warp notated in FIG. 3B by arrows indicating the desired movement of the corners from source coordinate locations to target coordinate locations. The remaining image layers of the composite image 301 are to remain unchanged. A "PerspectiveWarp" class can be implemented to allow users to specify the source coordinates corresponding to the corners of a source image, and the target coordinates corresponding to the desired locations of the corners in a target image. Applying the warp to the foreground layer image 302 generates a warped version 304 of the foreground layer image 302, as shown in FIG. 3C. The warped version 304 is then composited with the background layer image 303 to yield the composite image 305 as shown in FIG. 3D.

Figure 4:
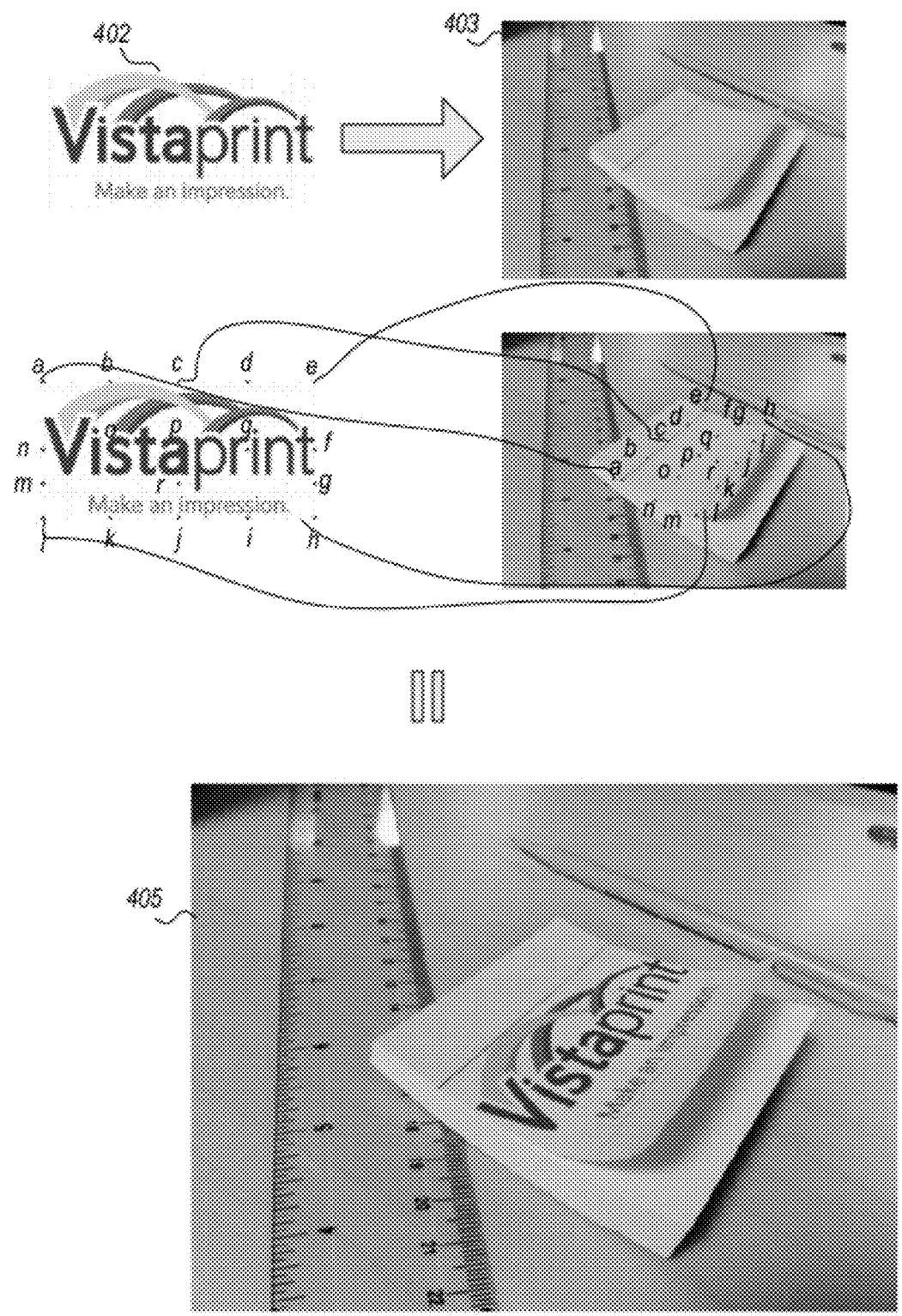
FIG. 4 diagrammatically illustrates a smooth warp.

Another type of warp is the smooth warp. The smooth warp is the most general type of warp. It is meant for cases which defy simple mathematical definition. For example, with reference to FIG. 4, suppose we want to warp the logo image 402 onto a scene image 403 of a slightly curved sticky note. In this example, a smooth warp can be specified by providing texture coordinates (e.g., texFeatures) a, b, . . . , r, on the logo image 402 and their corresponding and desired image coordinates (e.g., imgFeatures) A, B, . . . , R, on the background image (i.e., scene image 403).

var[,] texFeatures=new double[,] {
        {0.00, 0.00}, {0.25, 0.00}, {0.50, 0.00}, {0.75, 0.00},
          {1.00, 0.00}, {0.00, 0.50}, {0.25, 0.50}, {0.50, 0.50},
          {0.75, 0.50}, {1.00, 0.50}, {0.00, 0.75}, {0.50, 0.75},
          {1.00, 0.75}, {0.00, 1.00}, {0.25, 1.00}, {0.50, 1.00},
          {0.75, 1.00}, {1.00, 1.00}};
    var[,] imgFeatures=new double[,] {
        {223.0, 276.0}, {271.0, 235.0}, {310.0, 203.0}, {346.0, 173.0}, {378.0, 145.0}, {286.0, 315.0}, {330.0, 270.0}, {368.0, 230.0}, {401.0, 194.4{431.0, 162.0}, {326.0, 334.0}, {401.0, 241.0}, {459.0, 169.0}, {363.0, 341.0}, {402.0, 289.0},
{438.0, 244.0}, {469.0, 203.0}, {495.0, 168.0}};

Notice that in this particular implementation, the coordinates a, b, . . . , r, for the injectable image (i.e., the logo image 402) are specified in normalized texture (e.g., texFeature) coordinates: [0,0] corresponds to the upper left corner of the logo image 402 and [1,1] corresponds to the lower right corner of the logo image 402. The coordinates for the target image (i.e., the scene 403) are specified as standard image pixel coordinates (e.g., imgFeature). The warp is defined as:

var warp=new SmoothWarp(imgFeatures, texFeatures);
    The final result is shown at 405 in FIG. 4.

It is possible to simulate other types of warps using a smooth warp given enough point correspondences. However, using the appropriate type of warp when available (e.g., perspective or cylinder) will typically yield better results with less user input.

The Image Warping and Compositing Engine 210 also performs image compositing. Image compositing is the act of combining multiple images into a single image. The Image Warping and Compositing Engine 210 provides similar compositing functionality to common image manipulation software, such as Adobe® Photoshop. For example, the following layering and blending functionality is supported: Add, Darken, Difference, Exclusion, Lighten, Multiply, Normal, Overlay, Screen, Subtract.

Turning now to the Scene Framework 220, the Scene Framework 220 receives a scene description which adheres to a predefined format using a predefined scene-rendering language. In an embodiment, the scene rendering language is implemented using an intuitive HTML- or XML-like language format having an easy-to-understand notation that allows a user to specify image warping and compositing functions to describe how the image(s) are to be composited to create visually convincing renderings. The notation is simple enough that a creative designer can put together a sandwich that layers together imagery, documents, and transformation.

In an embodiment, scene descriptions 222 are XML documents that reside in a web tree along with their corresponding scene image resources 224 and injectables 226. A basic scene, such as the scene shown in FIG. 5, might consist of the following files:

/example/reflection.xml—the scene description 222—i.e., scene rendering code written in a text representation of a scene rendering language describing the geometric transformations and compositing of the scene
/example/mask.png—transparency of the mask layer is applied to all layers at deeper depth
/example/back.png—background image
/example/document.png—injectable image 226, for example a customer document to be injected into a scene.

Below is an example of the'rendering code contained in the reflection.xml file that may implement the rendering of the scene shown in FIG. 5:

```
<Scene>
 <Warps>
  <PerspectiveWarp id="placement" width="610" height="354">
   <Mapping sourcex="0.0" sourcey="0.0" targetx="267" targety="289" />
   <Mapping sourcex="1.0" sourcey="0.0" targetx="556" targety="289" />
   <Mapping sourcex="0.0" sourcey="1.0" targetx="267" targety="122" />
   <Mapping sourcex="1.0" sourcey="1.0" targetx="556" targety="122" />
  </PerspectiveWarp>
  <PerspectiveWarp id="reflection" width="610" height="354">
   <Mapping sourcex="0.0" sourcey="0.0" targetx="267" targety="289" />
   <Mapping sourcex="1.0" sourcey="0.0" targetx="556" targety="289" />
   <Mapping sourcex="0.0" sourcey="1.0" targetx="267" targety="456" />
   <Mapping sourcex="1.0" sourcey="1.0" targetx="556" targety="456" />
  </PerspectiveWarp>
 </Warps>
 Composite width="610" height="354" depth="0">
  <Document warp="placement" depth="0"/>
  <Composite width="610" height="354" mode="multiply" depth="50">
   <Image width="610" height="354" src="mask.png" mode="mask" depth="0" />
   <Document warp="reflection" depth="0" />
  </Composite>
  <Image width="610" height="354" src="background.png" depth="100" />
 </Composite>
</Scene>
```

In this scene, the customer's document ("Document") (i.e., the customer's business card preview image) is first warped by applying the "reflection" warp, which flips the image upside-down. The reflected image resulting from application of the "reflection" warp is than composited with a semi-transparent black gradient mask image ("mask.png") to generate a first composite image ("Composite" at depth "50") representing the reflection of the customer's business card. A perspective warp (called "placement") is then applied to the customer's business card image ("Document") to generate a placement warp image ("Document" at depth "0"). The first composite image, warped Document, and the background image are then composited to generate the final scene image depicted in FIG. 5, which depicts a reflection scene using the customer's document as the object being reflected.

Turning now to a discussion of the scene description language and notation, compositing is the act of combining and flattening images and image layers together into a static single-layer image (i.e., a flattened image).

The scene-rendering code 222 is preferably an XML file implemented using the scene-rendering language and describes how these image resources are combined with a document (i.e., an injectable) to create the composite scene image 228. In an embodiment, configurable scenes have two sections: a <Warps> section that defines geometric transformations (as described in more detail below), and a <Composite> section that defines how to assemble the document itself and other images.

The simplest scene 224 is an image (i.e., "image.jpg") itself.

```
<Scene>
  <Composite width="100" height="100">
    <Image src="image.jpg" width="100" height="100" />
  </Composite>
</Scene>
```

All elements have width and heights defined.
Scenes allow users to composite them as follows:

```
<Scene>
 <Composite width="100" height="100">
  <Document width="100" height="100" depth="0"/>
  <Image src="image.jpg" width="100" height="100" depth="100" />
 </Composite>
</Scene>
```

This scene combines a scene image "image.jpg" with an injectable "Document". In this example, a depth attribute has been added to the primitives to define layer ordering. Smaller depths indicate "closer" layers, so in this example the image "image.jpg" is "behind" the document "Document".

Composites can also be nested. An internal composite is assembled and then treated exactly like it is an image. This means that any internal depth parameters are ignored when assembling the parent composite.

```
<Scene>
  <Composite width="100" height="100">
    <Document width="100" height="100" depth="0"/>
    <Composite width="100" height="100" depth="50">
       <Image src="image2.png" width="100" height="100" depth="123908123" />
       <Image src="image3.png" width="100" height="100" depth="439087123"/>
    </Composite>
    <Image src="image.jpg" width="100" height="100" depth="100" />
  </Composite>
</Scene>
```

In the above example, the nested composite (i.e., the "Composite" at depth "50" (italicized)) is treated as any other 100-by-100 image and is assembled with depth 50.

Warping is defined as any operation that changes the geometry of the image. It can range from a simple resizing operation to a highly complex and nonlinear deformation. Each warp is identified by a name and specifies an output width and height.

```
<RectangleWarp id="icon" width="100" height="100">
 <Mapping sourcex="0.0" sourcey="0.0" targetx="10" targety="90" />
 <Mapping sourcex="1.0" sourcey="1.0" targetx="20" targety="80" />
</RectangleWarp>
```

As shown above, the rectangle warp requires the user to specify the desired placement of the lower-left (0,0) and upper-right and upper-right (1,1) corners of the source image. It simply places the source image, whatever size it may be, as a 10-by-10 icon (in texture coordinates) in the lower-left corner of the 100-by-100 pixel target canvas (in image coordinates) (leaving all other pixels transparent). The exact same effect can be achieved using a perspective warp.

```
<PerspectiveWarp id="icon2" width="100" height="100">
  <Mapping sourcex="0.0" sourcey="0.0" targetx="10" targety="90" />
  <Mapping sourcex="1.0" sourcey="0.0" targetx="20" targety="90" />
  <Mapping sourcex="0.0" sourcey="1.0" targetx="10" targety="80" />
  <Mapping sourcex="1.0" sourcey="1.0" targetx="20" targety="80" />
</PerspectiveWarp>
```

In contrast to the rectangle warp, the perspective warp requires the specification of all four corners of the source image. The above example is identical to a rectangle warp. More generally, a perspective warp allows users to "tilt the image away from the camera".

```
<Scene>
 <Warps>
   <PerspectiveWarp id="icon" width="100" height="100">
     <Mapping sourcex="0.0" sourcey="0.0" targetx="10" targety="90" />
     <Mapping sourcex="1.0" sourcey="0.0" targetx="20" targety="90" />
     <Mapping sourcex="0.0" sourcey="1.0" targetx="10" targety="80" />
     <Mapping sourcex="1.0" sourcey="1.0" targetx="20" targety="80" />
   </PerspectiveWarp>
 </Warps>
 <Composite width="100" height="100">
  <Document warp="icon" depth="0"/>
  <Image src="image.jpg" width="100" height="100" depth="100" />
 </Composite>
</Scene>
```

In the above example, the document ("Document") in the composite ("Composite") now references the perspective warp by name "icon". The reference makes it unnecessary to define the width and height of the document. Instead, the width and height comes from the warp. In general, warps can be applied to both the document and image primitives as well as on nested composites.

The smooth warp follows the same template as the perspective warp but allows for more general deformations. FIG. 6A depicts an image 602 and arrows illustrating the source and destination locations of the corners and middle of the image. The smooth warp may be defined in scene rendering notation as:

```
<SmoothWarp id="blah" width="100" height="100">
  <Mapping sourcex="0.0" sourcey="0.0" targetx="10" targety="90" />
  <Mapping sourcex="1.0" sourcey="0.0" targetx="20" targety="90" />
  <Mapping sourcex="0.0" sourcey="1.0" targetx="10" targety="90" />
  <Mapping sourcex="1.0" sourcey="1.0" targetx="20" targety="80" />
  <Mapping sourcex="0.5" sourcey="0.5" targetx="17" targety="87" />
</SmoothWarp>
```

As illustrated, the smooth warp specification is similar to the perspective warp, except it also specifies the desired location of the source image center (0.5,0.5). FIG. 6B shows the resulting image 604 after application of the smooth warp "w" to the image 602. The smooth warp allows an arbitrary number of mappings and, unlike the perspective warp, does not require the corners to be specified. In general, the warp=attribute may be applied wherever width=and height=are used, except for the top level <Scene>, and so long as all sizes are consistent.

To extend the capabilities of composites, the scene rendering code also allows several blending modes: Add, Darken, Difference, Exclusion, Lighten, Multiply, Normal, Overlay, Screen, Subtract. These are applied from background to foreground: the bottom/deepest layer/primitive is composited with the layer/primitive immediately above it, and the process is repeated until the image is flat. Blending modes in nested composites are not visible from the parent composite.

The Scene Framework 220 also supports a Mask mode, as in the following example:

```
<Composite width="610" height="354" depth="0">
  <Document warp="placement" depth="0"/>
  <Composite width="610" height="354" mode="multiply" depth="50">
    <Image width="610" height="354" src="mask.png" mode="mask" depth="0" />
    <Document warp="reflection" depth="0" />
  </Composite>
  <Image width="610" height="354" src="background.png" depth="100" />
</Composite>
```

The Mask mode applies the alpha channel of the image to the layers below it (while ignoring the color channels). Notice that the above example applies the mask in a nested composite. This is to avoid also masking the background image (again, since blending modes are not passed through).

Figure 7:
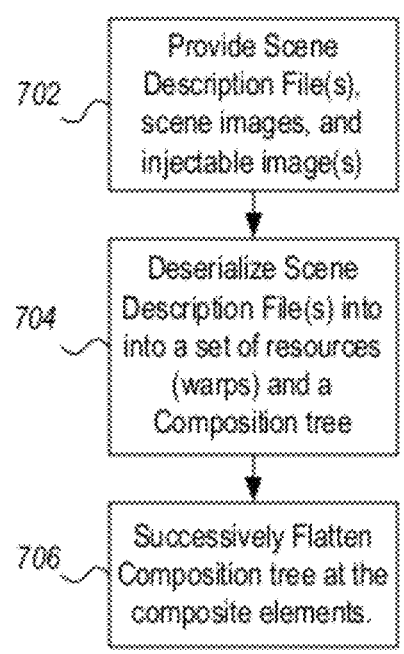
FIG. 7 is a flowchart illustrating an exemplary method for generating scenes with dynamically-generated content for display.
Figure 8:
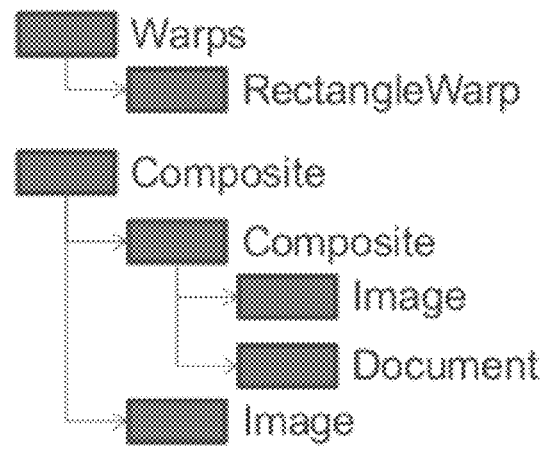
FIG. 8 illustrates a representation of a composition tree.

FIG. 7 is a flowchart exemplifying a method of generating scenes with dynamically-generated content for display. As illustrated in FIG. 7, each scene is described in a scene description 224 (e.g., using the XML definitions described above) according to the scene-rendering language (step 702). The scene description 224 describes the layering, blending, warping, and specific image manipulations that should be applied when injecting injectables 226. The scene description 224 is deserialized by the Scene Framework 220 into a set of resources (warps) and a Composition tree (step 704). The composition tree plus resources is the internal representation of the scene. For example, a scene description file as follows may be decomposed into the tree shown in FIG. 8.

```
<Scene>
    <Warps>
        <RectangleWarp id="blah" width="601" height="817">
            <Mapping sourcex="0.49962077" sourcey="0.00459265" targetx="5" targety="64" />
            <Mapping sourcex="0.96038339" sourcey="0.72623802" targetx="592" targety="812" />
        </RectangleWarp>
    </Warps>
    <Composite width="601" height="817">
        <Composite width="601" height="817" depth="0">
            <Image src="oldm.png" mode="mask" depth="0" />
            <Document height="1200" warp="blah" depth="2"   />
        </Composite>
        <Image src="oldf.png" depth="1900" />
    </Composite>
</Scene>
```

Figure 9:
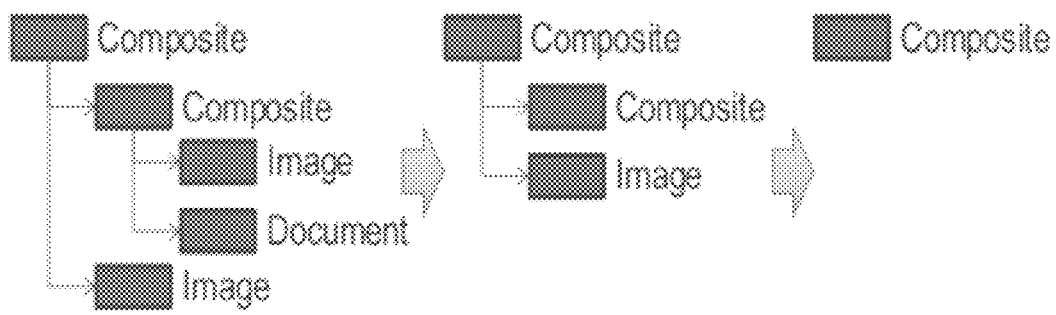
FIG. 9 diagrammatically illustrates a flattening operation.

The composition tree is successively flattened at the composite elements (in one embodiment, in a depth first manner) (step 706). Each element is ordered and merged with the other elements, as illustrated in FIG. 9. Each merge even applies the appropriate bending mode and warping. The output of step 706 is a static (i.e., flattened) image.

In an embodiment, the scene description 222 is styled within a predefined scene-rendering code template, such as the following:

```
public void MakeAScene(Bitmap bitmap, Rectangle rect)
{
    var sceneFactory = new SceneFactory( );
    var scene =
        SceneFactory.LoadScene(@\\devyourhost\Scenes\scene.xml);
    var proxy = new ReplaceableImageContainer( );
    var lockedBitmap = new BitmapDataLockedSimpleBitmap(bitmap,
        rect, ImageLockMode.ReadWrite);
    scene.Render(proxy, lockedBitmap);
    //Now you can do whatever you want with the locked bitmap
}
private class ReplaceableImageContainer : IReplaceableImageContainer
{
    // Your Code Here!!!
}
```

Figure 10:
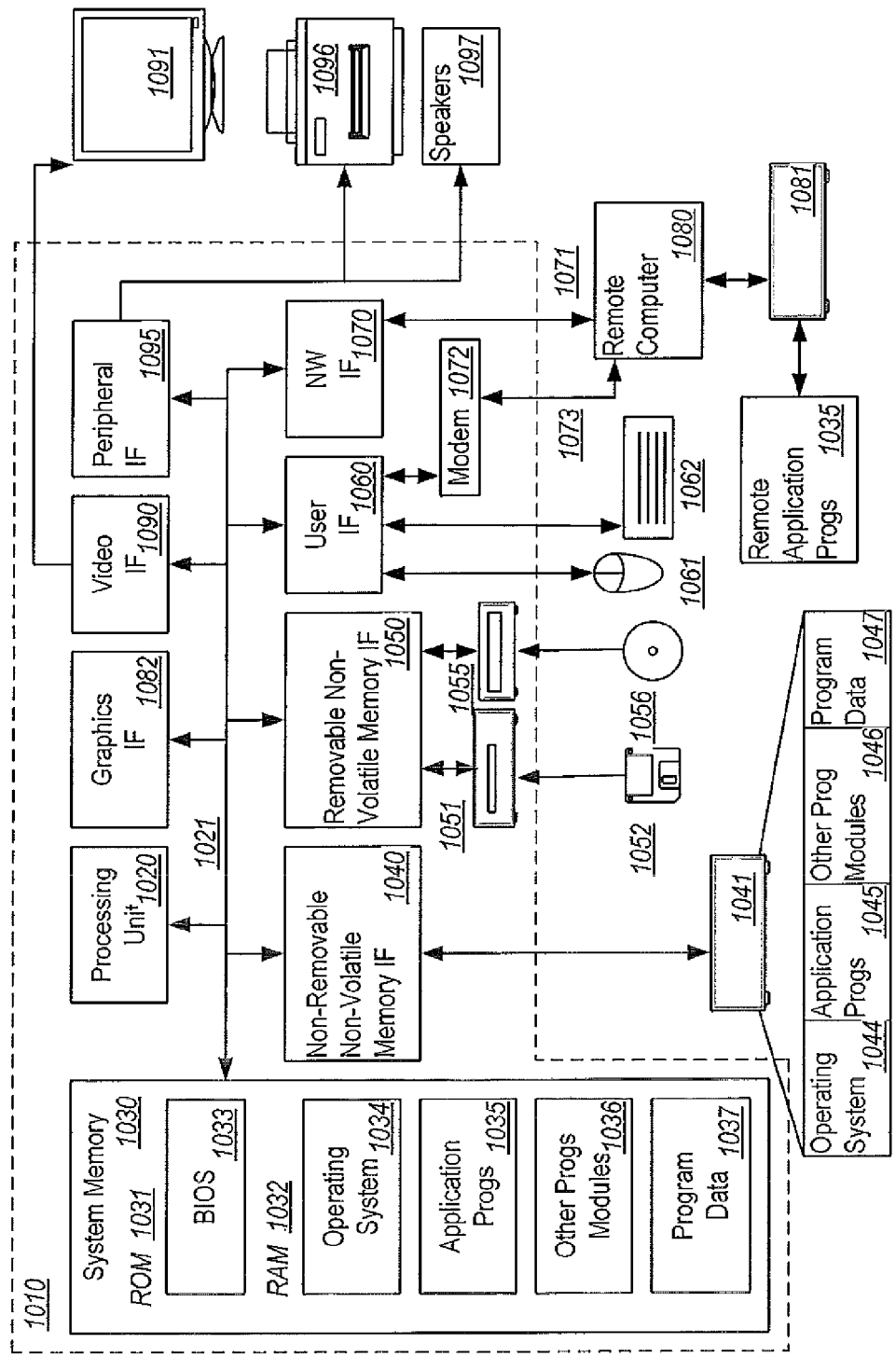
FIG. 10 is an exemplary computing environment in which embodiments of the invention may operate.

FIG. 10 illustrates a computer system 1010 that may be used to implement any of the servers and computer systems discussed herein, including the Image Warping and Composite Engine 210, the Scene Framework Engine 220, the Renderer 230, any client requesting services of the Framework 220, and any server on which any of the components 210, 220, 230 are hosted. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 1010. Computer storage media typically embodies computer readable instructions, data structures, program modules or other data.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1040 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10 provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1090.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The system 200 for generating a composite scene image can be advantageously used to render personalized scenes for personalizing a website experience. Scenes can be personalized for each customer when visiting a products vendor website or can be emailed to a customer to enhance an offer, for example and offer for a reorder by the customer of a customer's previously ordered product. The system 200 can also be used to generate personalized scenes containing customer personalized products that the customer has not yet ordered and/or designed. Such preview images of products not yet ordered or designed by the customer can be automatically generated by a vendor server using information provided by the customer from a previous order or account information along with alternative vendor-retained templates and images. Such system-generated personalized products can be used to provide suggestions of other products that the customer may be interested in ordering.

Figure 11:
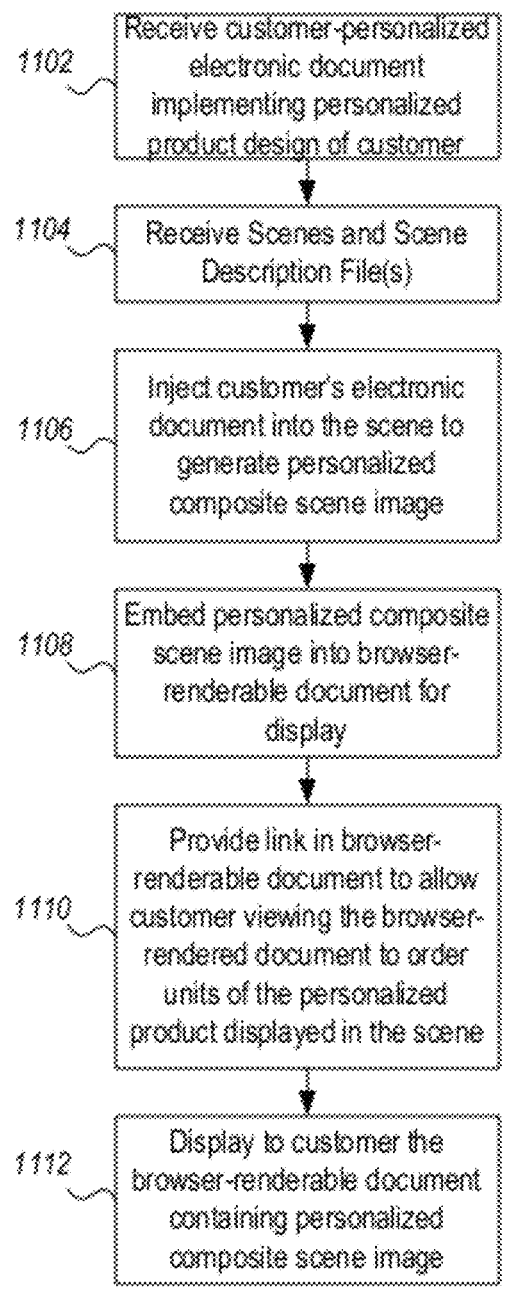
FIG. 11 is a flowchart illustrating an exemplary embodiment of a method for personalizing a scene with a customer's document.

FIG. 11 is a flowchart illustrating the general methodology for personalizing scenes with customer documents and using the personalized scenes to solicit interest in order/reorder of products. In general, one or more processors receives an electronic document implementing a personalized product design of a customer (step 1102) and one or more Scene images and corresponding Scene Description files (step 1104). The one or more processors inject the customer's electronic document into the Scene(s) according to the instructions provided by the corresponding Scene Description (step 1106). The personalized composite scene image is then automatically embedded into a browser-renderable document (step 1108). A link to a page allowing a user to order units of the personalized product may also be provided in the browser-renderable document (step 1110), by one or more processors into a browser-renderable document. The personalized browser-renderable document is then displayed to the customer (step 1112).

Figure 12:
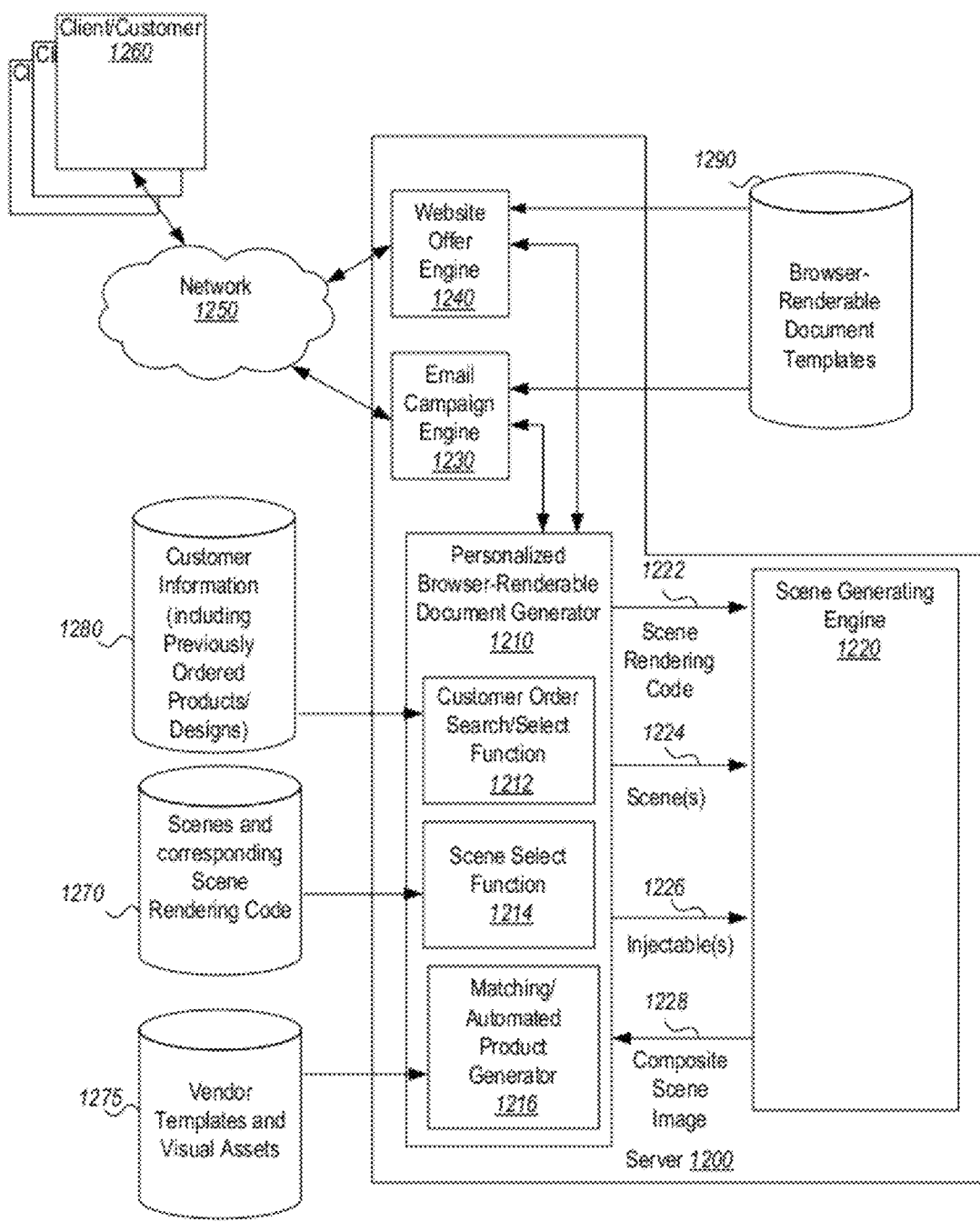
FIG. 12 is a block diagram of an exemplary system for generating personalized offers on web pages and in email messages.
Figure 13:
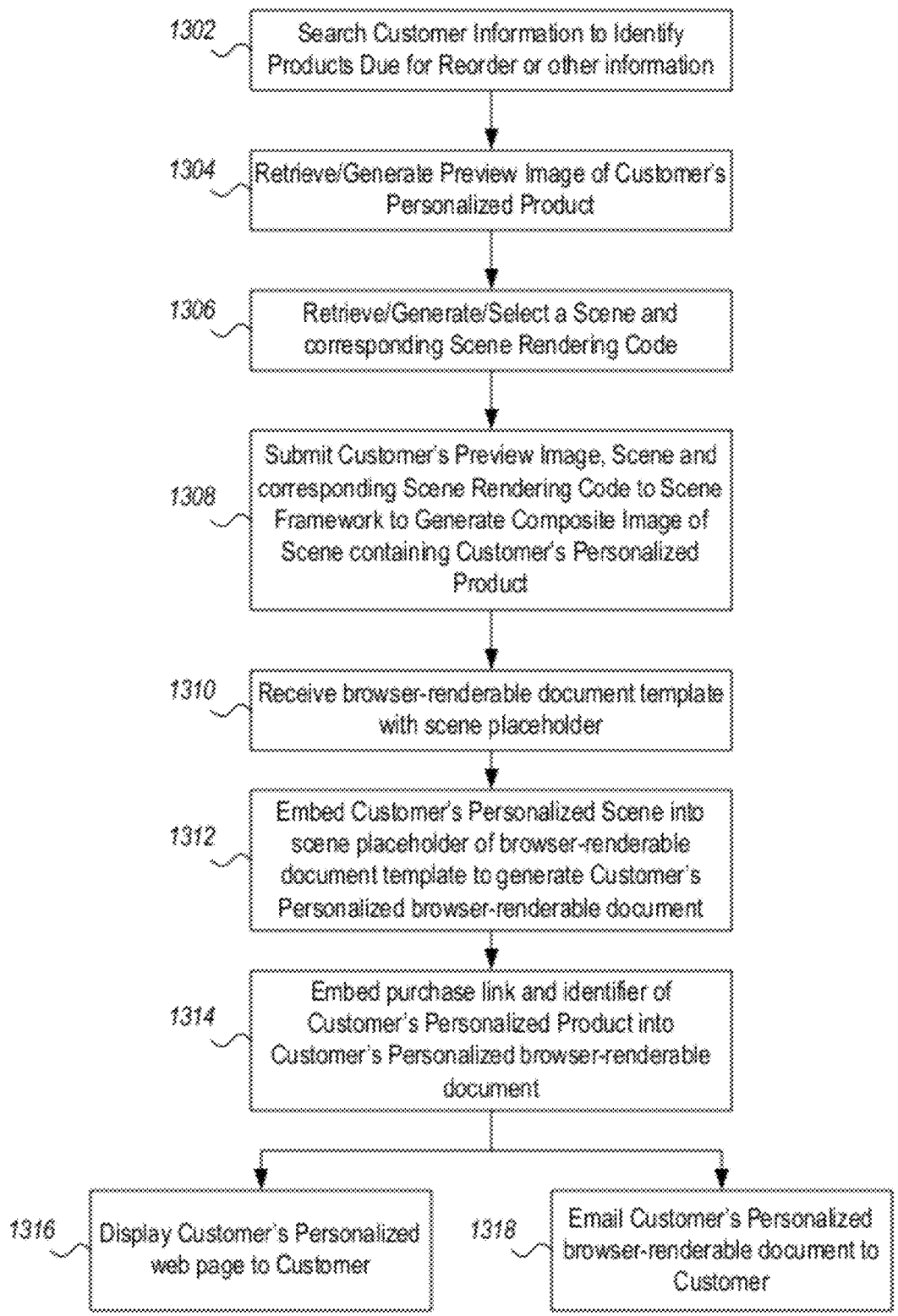
FIG. 13 is a flowchart illustrating an exemplary embodiment of a method for diagrammatically illustrates the generation of a scene personalized with a customer's previously ordered document in accordance with an embodiment of the invention.

FIG. 12 depicts an exemplary embodiment of a system of implementation. FIG. 13 illustrates a corresponding method. In an embodiment, a vendor server 1200 may receive an electronic document implementing a personalized product design of a customer (step 1304). For example, referring to the system shown in FIG. 12, in an embodiment, a vendor server 1200 includes a Personalized Browser-Renderable Document Generator 1210 which includes a Customer Order Search and/or Select Function 1212 that searches a Customer Information Database 1280 for customer information. The Customer Order Search/Select Function 1212 may search for customer orders that are due for reorder (step 1302), for example orders that were shipped to a customer after a certain amount of time has passed. As a specific but non-limiting example, the Search/Select Function 1212 may search for customers who ordered a business card product and have not reordered after the passage of a certain about of time (e.g., 6 months).

Alternatively, the Search/Select Function 1212 may search for customers who have recently ordered a particular product, or who are currently ordering a particular product, and may further instruct a Matching Products Generator 1216 to automatically, and without customer request, generate a preview image of a different product personalized with customer information. The different personalized product may contain matching visual assets such as identical or similar images, borders, backgrounds, fonts, color schemes, etc. For example, given a customer who is in the process or ordering a particular business card with a particular border, font scheme, color scheme, and image, the server 1200 may instruct the Matching Products Generator 1216 to generate a preview image of one or more of a return address label, a stationery product, an envelope, a magnet, a pen, a website, a t-shirt, etc., that includes at least some of the customer information provided in the business card and at least some visual assets (e.g., images, border, background, color scheme, font scheme, etc.) of the business card. Techniques for generating matching preview images are described in more detail in U.S. Pat. Nos. 7,490,057, 7,519,548, and 7,607,084, and in U.S. patent application Ser. No. 11/082,543 and, each of which is hereby incorporated by reference for all that it teaches.

In an alternative embodiment, the different personalized product may include different visual designs containing images and other visual assets that may be algorithmically determined by the system to be relevant to some aspect of the customer information retained by the vendor. For example, an Automated Product Generator may search the Vendor Templates and Visual Assets database 1275 for images related to the region indicated by the customer's zipcode and generate a preview image of a new personalized product containing at least some customer information and a related image. As another example, the Automated Product Generator may search the Vendor Templates and Visual Assets database 1275 for images related to an industry indicated in the customer's title field of the business card.

Preview images of previously ordered products or of products generated by the Matching/Automated Product Generator 1216 may then be used by the Personalized Browser-Renderable Document Generator 1210 to generate customer-personalized scenes for generating visually pleasing offers to their customers.

Once the vendor server receives an electronic document implementing a personalized product design of a customer (step 1304), the vendor server 1200 retrieves, generates, or selects a Scene and corresponding Scene Rendering Code (step 1306). In the system of FIG. 12, the Personalized Browser-Renderable Document Generator 1210 includes a Scene Select Function 1214 that searches a Scenes Database 1270 for one or more scenes. In one exemplary embodiment, the Scene Select Function 1214 selects a scene based on information extracted from retrieved customer information. For example, if the customer ordered a business card, the Scene Select Function 1214 may search for scenes in which business cards would be relevant. The scene images and corresponding scene rendering code 1270 stored in the Scenes database 1270 may be tagged with keywords. For example, some scenes may incorporate images of people exchanging a business card, or show an office with a desk on which a business card holder holding a business card is shown, etc. Such scenes could be tagged with the keyword phrase "business card" or "office" to indicate to the Scene Select Function 1214 that such scene would be suited for injection of the preview image of the customer's personalized business card into the scene. Additional keyword tags, relevant to such aspects as a customer's zipcode, industry, etc. could also be associated with the scenes and used by the Scene Select Function 1214 to identify scenes that are potentially relevant to the customer.

Given one or more selected/generated preview image(s) of a personalized product and one or more selected Scene image(s) and corresponding Scene Description(s), the server injects the customer's document (i.e., personalized preview image) into the Scene(s) to generate a customer-personalized composite scene image (step 1308). In the system of FIG. 12, the Personalized Browser-Renderable Document Generator 1210 submits the selected/generated preview image(s) 1226 of a personalized product and one or more selected Scene image(s) 1224 and corresponding Scene Description file(s) 1222 and instructs the Scene Generating Engine 1220 to generate a customer-personalized composite scene image 1228.

The server 1200 then retrieves or receives a browser-renderable document template with a scene placeholder for insertion of composite scene images (step 1310). In the embodiment shown in FIG. 12, this step is performed by either or both of a Website Offer Engine 1240 and an Email Campaign Engine 1230. These engines 1230 and 1240 are configured to select vendor-supplied email document templates and/or web page document templates having placeholders for inserting a customer-personalized composite scene image 1228 and/or a link to the customer-personalized composite scene image 1228.

The server then embeds the customer-personalized composite scene image 1228 into a browser-renderable document which can be displayed in a browser on a computer display (step 1312). The server 1200 also embeds a link in the customer-personalized browser-renderable document to allow the customer viewing the document to order units of the personalized product displayed in the scene (step 1314). In the embodiment of FIG. 12, steps 1312 and 1314 are performed by the Website Offer Engine 1240 and/or Email Campaign Engine 1230.

The customer's personalized browser-renderable document 1232 is then displayed in a browser on a computer display for customer viewing. In a website offer campaign, the customer's personalized browser-renderable document is displayed to the customer on a web page (step 1318) when the customer visits the vendor website. The customer's personalized browser-renderable document 1232 may be displayed upon the customer's first navigation to the website for a given session, or may be presented as the customer begins to design a product, and/or during or after the order of a product.

If an email campaign is being conducted, the email message 1242 with embedded customer-personalized composite scene image 1028 is emailed to the customer (step 1116) and displayed to the customer when the customer opens the email message.

In an embodiment, if the customer clicks an order link in the web page or email message, the customer's browser 1264 redirects to an order page in communication with an order processing server 1292 to allow the customer to order units of the personalized product displayed in the scene 1228. The web page or email message may also include an edit link which, when clicked by the customer, redirects the user's browser 1264 to an edit page in communication with the server 1200 for editing the design of the product shown in the preview image 1228. In both cases, a product design identifier is embedded in the web page and/or email and is transmitted to the server along with the URL of the order and/or edit page when the user clicks the order and/or edit link. The product design identifier identifies to the server how to construct the design and/or which design to retrieve in accordance with details described in more detail in U.S. Pat. Nos. 7,490,057, 7,519,548, and 7,607,084, and in U.S. patent application Ser. No. 11/082,543.

Figure 14:
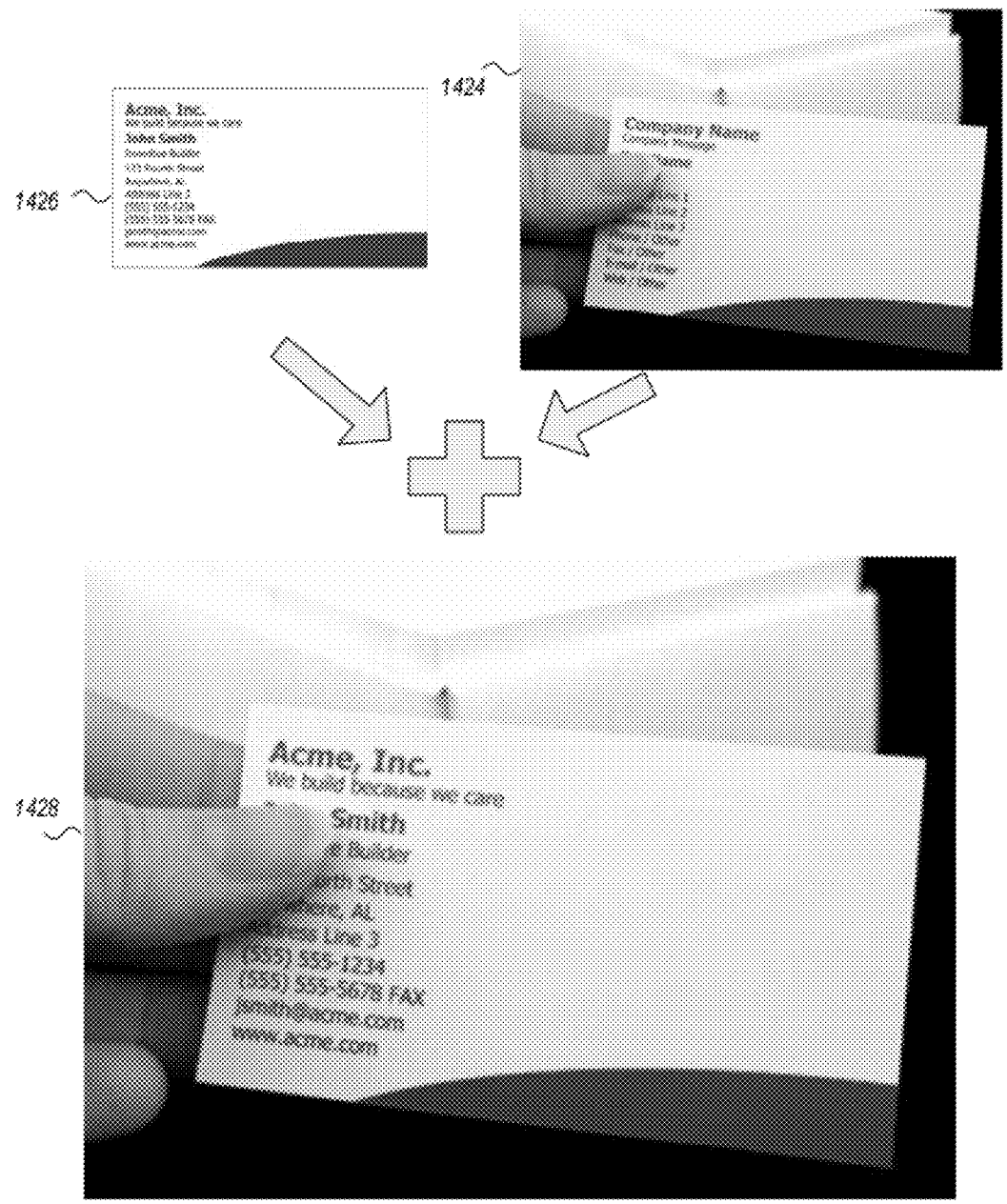
FIG. 14 diagrammatically illustrates injection of an image of a customer's document into a contextual scene to generate a personalized scene image.

FIG. 14 illustrates how a preview image 1426 of a customer's previously ordered product can be inserted into a scene 1424 to generate a personalized scene 1428 having the customer's previously ordered product embedded in the scene. As illustrated, a Scene image 1424 and the preview image 1426 of the customer's previously ordered product are each submitted to the Scene Generating Engine 1220 (of FIG. 12), along with corresponding scene rendering code, to generate the resulting composite image scene 1428 personalized for the customer.

Example scene rendering code implementing a scene description is as follows:

```
<?xml version="1.0" encoding="utf-8" ?>
<Scene>
  <Warps>
    <PerspectiveWarp id="quad" width="234" height="304">
      <Mapping sourcex="0.01694915" sourcey="0.02926829"
        targetx="51" targety="0" />
      <Mapping sourcex="0.98305084" sourcey="0.02926829"
        targetx="234" targety="162" />
      <Mapping sourcex="0.01694915" sourcey="0.97073170"
        targetx="0" targety="129" />
      <Mapping sourcex="0.98305084" sourcey="0.97073170"
        targetx="162" targety="304" />
    </PerspectiveWarp>
    <RectangleWarp id="rect" width="469" height="302">
      <Mapping sourcex="0" sourcey="0" targetx="267" targety="5" />
      <Mapping sourcex="1" sourcey="1" targetx="423" targety="208" />
    </RectangleWarp>
  </Warps>
  <Composite width="469" height="302" depth="0">
    <Image src="card_box_over.png" depth="0" />
    <!-- double warp for better quality -->
    <Composite width="469" height="302" depth="1"
      mode="multiply">
      <Composite width="234" height="304" warp="rect">
        Replaceable width="200" height="120" warp="quad" />
      </Composite>
    </Composite>
    <Image src="card_box_back.png" depth="2" />
  </Composite>
</Scene>
```

As illustrated, the final composite scene 1428 is made up of three layers: The image "card_box_back.png" is the background layer, the injectable "Replaceable" (i.e., the customer's business card preview image) is the middle layer, and the image "card_box_over.png" is the top layer. The final composite 1228 is generated by performing a perspective warp (i.e., id="quad") on the injected Replaceable, then performing a rectangular warp on the warped Replaceable, and then layering the background, warped Replaceable, and foreground images according to their depth.

Figure 15:
FIG. 15 is an example email message illustrating use of a personalized scene in an email template to generate personalized messages showing previously ordered products in context.

Below is the source code for an illustrative email template which may be utilized by the Email Campaign Engine 1230 to generate personalized email messages for a customer which contains a scene image having an image of a customer personalized product embedded in the scene. FIG. 15 shows an example personalized email message based on the template below.

```
<meta http-equiv="Content-Type" content="text/html; charset=iso-8859-1"><a
href="http://www1.abccompany.com/"><img border="0" src=http://www. abccompany.com/images/
html_email_header.gif" target="headerwindow"></a>
<table width="700" style="font-family:Helvetica, Arial, sans-serif; font-size:12px;">
<tr valign="top" style="width:500px;">
 <td id="info" style="width:450px;">
   <table>
        <tr>
            <td>
                <p id="username" style="font-family:Helvetica, Arial, sans-serif; font-size:15px;
                padding-bottom:10px;">
                    Hello!
                </p>
                <p style="font:normal 11px Verdana, Arial, Helvetica, sans-serif; margin:5px 0;">Time
                    to reorder! </p>
            </td>
        </tr>
   </table>
   .
   .
   .
<table id="myReorder" style="width:450px;">
    <tr>
        <td width="452" style="padding:10px 0px;">
            <a href="http://my.abccompany.com/Controller?appname=reorder&
                workflowname=getLastOrderPreview&customerID=18433562&sceneId=
                1414964&"
            /a>
            </span>
        </td>
    </tr>
   .
   .
   .
```

In summary, the scene rendering framework can be used to enhance a customer's experience when visiting a vendor website or when viewing emailed offers from the vendor. By personalizing products with customer information and embedding (and transforming) images of the personalized products into various scenes, the customer understands how their product will appear in a larger context. The preview of a dynamically generated document personalized for a customer may be transformed in various ways, and placed inside a larger scene, to show how it may be used or how it may be incorporated on additional products. Furthermore, scenes can be chained or cascaded, so that one scene can be part of another scene and so forth. A scene may incorporate more than one placeholder location for a replaceable scene element such as the business card above.

What is claimed is:

1. A method, comprising:
   receiving an electronic document implementing a personalized product design
   receiving by one or more processors a scene image comprising a placeholder element:
   receiving a scene description, the scene description comprising computer-readable scene rendering instructions implementing warping and composing functionality to specify how an injectable scene element is to be warped and composited with a scene to dynamically generate a composite image
   processing the received scene description using the received scene image as the scene image in the scene description, and further using the electronic document as the received injectable scene element, the processing comprising performing the warping and compositing functionality specifying how the injectable scene element is to be warped and composited with the received scene image to dynamically generate a personalized composite scene image;
   embedding the personalized composite scene image into a browser-renderable document:
   wherein the scene description comprises a warping specification which defines one or more geometric transformations that change the geometry of an image, and a compositing specification which defines how to composite the specified scene images and the received injectable scene elements and specifies application of one or more of the defined geometric transformations to one or more of the specified scene images and received injectable scene elements, and wherein the compositing specification specifies a composition tree comprising a plurality of individual composite descriptions, the method further comprising:
   processing each of the plurality of individual composite descriptions to generate a respective individual flattened composite image prior to processing a different composite description which includes the respective individual composite description and such that the respective individual flattened composite image is utilized in place of the respective individual composite description in processing the different composite description.

2. The method of claim 1, wherein the browser-renderable document is a web page.

3. The method of claim 2, wherein the web page includes an interactive element configured to allow the customer viewing the web page to order products displaying the personalized product design of the customer.

4. The method of claim 3, wherein the personalized product design of the customer is a design displayed on a product previously ordered by the customer and the interactive element allows the user to reorder additional units of the product previously ordered by the customer.

5. The method of claim 1, wherein the browser-renderable document is an email message.

6. The method of claim 5, wherein the email message includes a hyperlink to a website that allows the user to order products displaying the personalized product design of a customer.

7. The method of claim 6, further comprising:
   emailing the email message to the customer.

8. The method of claim 5, wherein the personalized product design of the customer is a design displayed on a product previously ordered by the customer and the email message includes a hyperlink to a website that allows the user to reorder additional units of the product previously ordered by the customer.

9. The method of claim 8, further comprising:
   emailing the email message to the customer.

10. The method of claim 1, further comprising:
    generating the personalized product design of the customer.

11. The method of claim 1, wherein at least some of the individual composite descriptions are nested at different levels of a compositing tree, and the respective individual composite images are generated and flattened according to deepest depth first.

12. The method of claim 1, wherein the warping specification defines at least one of a rectangular warp, a perspective warp, or a smooth warp.

13. The method of claim 1, compositing the received one or more injectable scene elements on different layers than the specified one or more scene images.

14. The method of claim 1, further comprising:
    rendering the composite scene image on a display screen.

15. Non-transitory computer readable storage tangibly embodying program instructions which, when executed by a computer, implement a method for generating scenes with dynamically-generated content for display, the method comprising:
    receiving an electronic document implementing a personalized product design
    receiving by one or more processors a scene image comprising a placeholder element:
    receiving a scene description, the scene description comprising computer-readable scene rendering instructions implementing warping and compositing functionality to specify how an injectable scene element is to be warped and composited with a scene to dynamically generate a composite image
    processing the received scene description using the received scene image as the scene image in the scene description, and further using the electronic document as the received injectable scene element, the processing comprising performing the warping and compositing functionality specifying how the injectable scene element is to be warped and composited with the received scene image to dynamically generate a personalized composite scene image;
    embedding the personalized composite scene image into a browser-renderable document;
    wherein the scene description comprises a warping specification which defines one or more geometric transformations that change the geometry of an image, and a compositing specification which defines how to composite the specified scene images and the received injectable scene elements and specifies application of one or more of the defined geometric transformations to one or more of the specified scene images and received injectable scene elements, and wherein the compositing specification specifies a composition tree comprising a plurality of individual composite descriptions, the method further comprising:

processing each of the plurality of individual composite descriptions to generate a respective individual flattened composite image prior to processing a different composite description which includes the respective individual composite description and such that the respective individual flattened composite image is utilized in place of the respective individual composite description in processing the different composite description.

16. The non-transitory computer readable storage of claim 15, wherein the browser-renderable document is a web page.

17. The non-transitory computer readable storage of claim 16, wherein the web page includes an interactive element configured to allow the customer viewing the web page to order products displaying the personalized product design of the customer.

18. The non-transitory computer readable storage of claim 17, wherein the personalized product design of the customer is a design displayed on a product previously ordered by the customer and the interactive element allows the user to reorder additional units of the product previously ordered by the customer.

19. The non-transitory computer readable storage of claim 15, wherein the browser-renderable document is an email message.

20. The non-transitory computer readable storage of claim 19, wherein the email message includes a hyperlink to a website that allows the user to order products displaying the personalized product design of a customer.

21. The non-transitory computer readable storage of claim 20, further comprising:
emailing the email message to the customer.

22. The non-transitory computer readable storage of claim 19, wherein the personalized product design of the customer is a design displayed on a product previously ordered by the customer and the email message includes a hyperlink to a website that allows the user to reorder additional units of the product previously ordered by the customer.

23. The non-transitory computer readable storage of claim 22, further comprising:
emailing the email message to the customer.

24. The non-transitory computer readable storage of claim 15, further comprising:
generating the personalized product design of the customer.

25. The non-transitory computer readable storage of claim 15, wherein at least some of the individual composite descriptions are nested at different levels of a compositing tree, and the respective individual composite images are generated and flattened according to deepest depth first.

26. The non-transitory computer readable storage of claim 15, wherein the warping specification defines at least one of a rectangular warp, a perspective warp, or a smooth warp.

27. The non-transitory computer readable storage of claim 15, compositing the received one or more injectable scene elements on different layers than the specified one or more scene images.

28. The non-transitory computer readable storage of claim 15, further comprising:
rendering the composite scene image on a display screen.

* * * * *